Nov. 10, 1970 — S. LEAVITT — 3,538,520
LAVATORY SANITATION BODIES
Filed Dec. 26, 1967 — 2 Sheets-Sheet 2
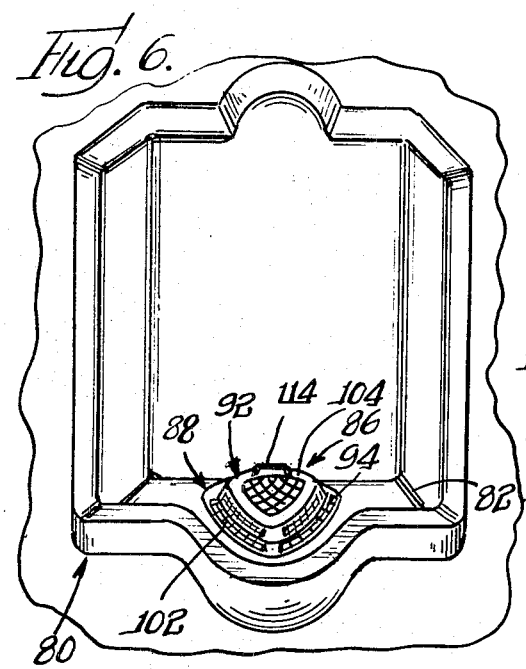
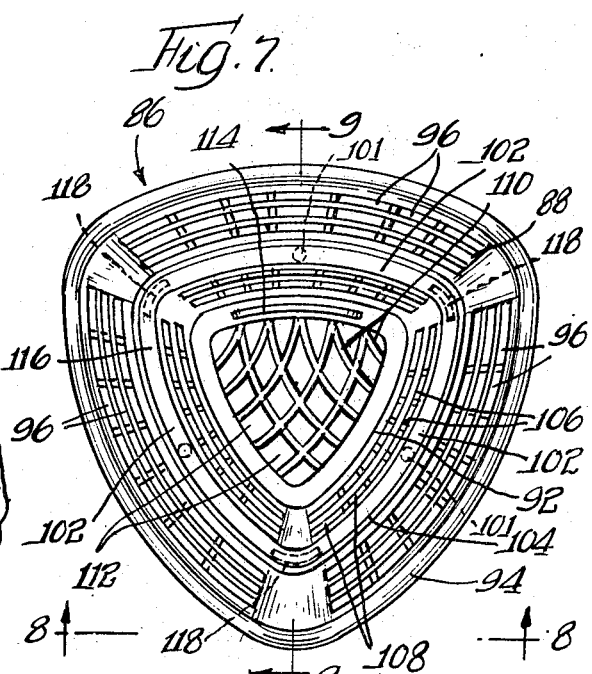
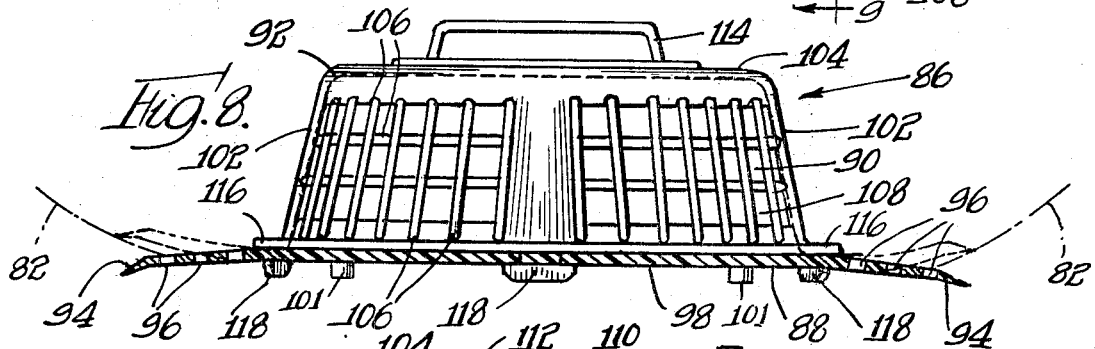
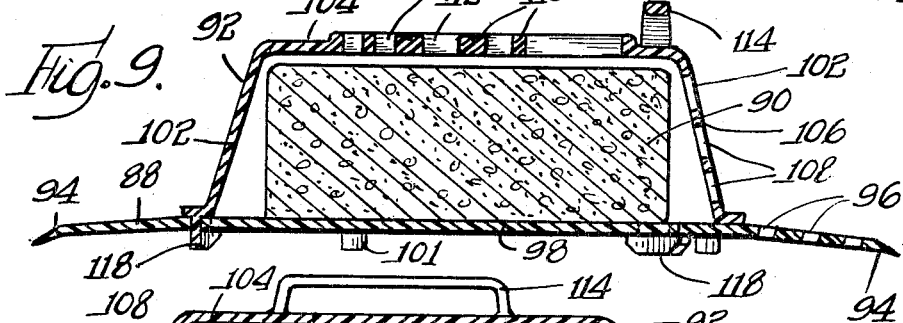
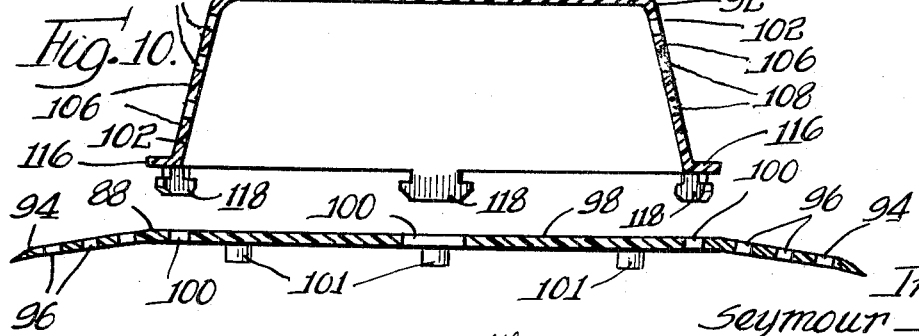
Inventor
Seymour Leavitt
By: Wallenstein, Spangenberg, Hattis & Strampel attys.

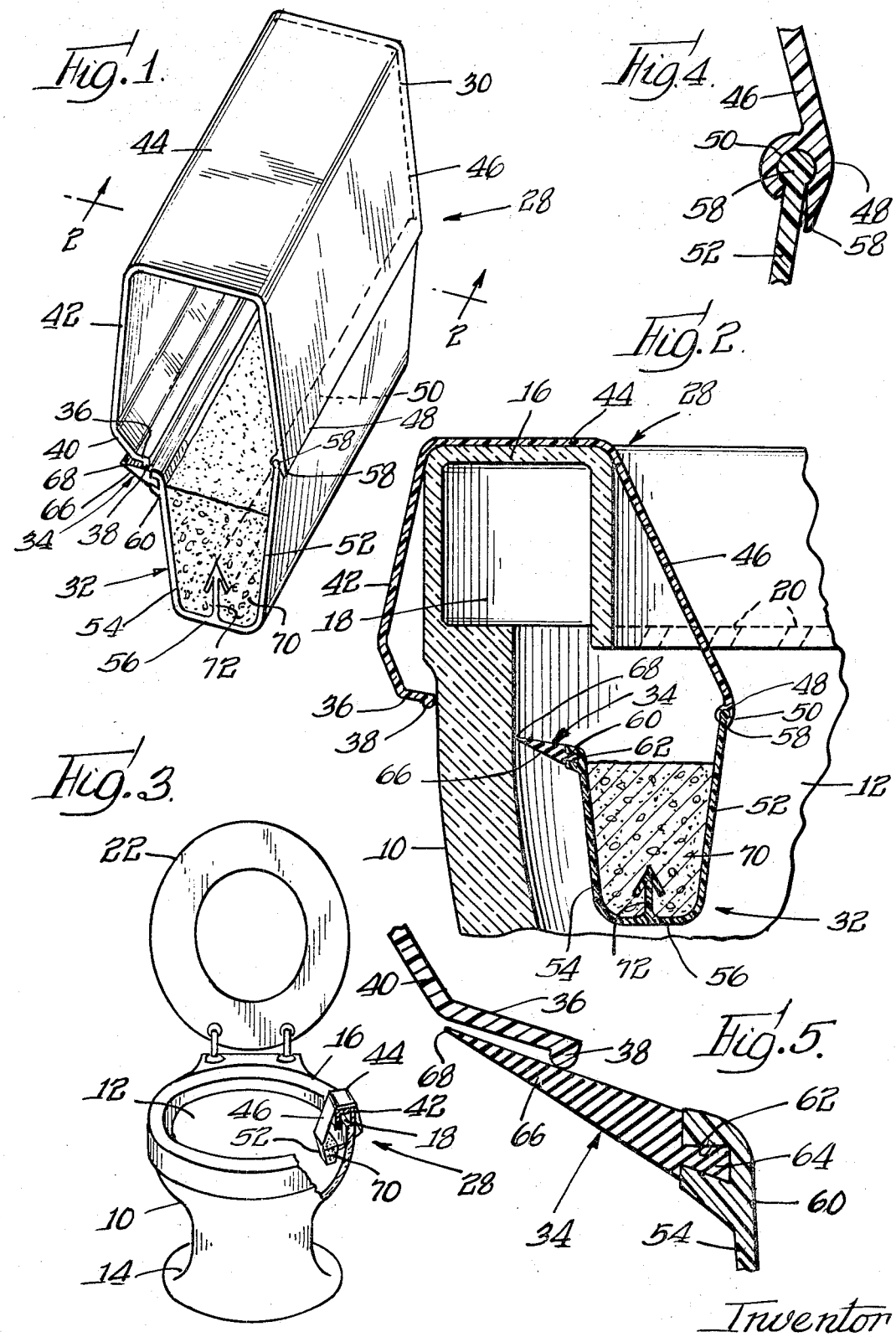

3,538,520
LAVATORY SANITATION BODIES
Seymour Leavitt, Lincolnwood, Ill., assignor to Madison Chemical Corporation, Maywood, Ill., a corporation of Delaware
Filed Dec. 26, 1967, Ser. No. 693,488
Int. Cl. E03d 9/02
U.S. Cl. 4—222                                                     13 Claims

ABSTRACT OF THE DISCLOSURE

Bodies for use in connection with sanitary units such as toilet bowls, urinals and the like, which are positioned in relation thereto in a manner whereby flush water will come into direct contact with at least a portion of the bodies. The bodies include a solid sanitizing material which will dissolve in part with each flushing thereby to provide automatic and metered cleaning, disinfecting, deodorizing, and the like, of the toilet bowl or urinal. The solid sanitizing material which advantageously is in bar or premolded form comprises, as its essential active ingredients, an intimate admixture of (a) one or more synthetic detergents which are solid at room temperatures, and (b) an acidic agent in the form of one or more acids or acid-forming salts or both, the ratio of the synthetic detergent to the acidic agent in the solid, sanitizing material ranging preferably from about 1 to 100 of the former to about 1 of the latter. The bodies, in their preferred form, include a holder, one embodiment of which can be attached to the rim of a toilet bowl and another embodiment of which can be placed in a urinal, each embodiment serving to support said solid sanitizing material in a position in a bowl or urinal whereby flush water will come into direct contact therewith with each flushing of the bowl.

---

Toilet bowls, urinals, and the like, require constant care to prevent the buildup of unsightly deposits, both organic and inorganic in origin, to reduce odors and to keep bacteria growth at minimally safe levels. In an effort to cope with at least some of these problems, products such, for example, as paradichlorobenzene, usually in cake form, have been widely used. Paradichlorobenzene cakes, however, function primarily as odor maskants, and, while in certain instances, other ingredients such as disinfectants are incorporated in the cakes, they provide no cleansing action and afford no protection against buildup of undesirable deposits, stains, and encrustations common to sanitary units of the type here under consideration. Heretofore, the only effective method of overcoming the problems encountered with such sanitary units is daily, manual swabbing with, for example, standard powder or granular sanitizing agents.

In accordance with the present invention, there is provided means for enabling continuous and complete protection for toilet bowls, urinals, and the like, against the aforementioned problems without the necessity for daily care by maintenance personnel.

The objectives of the present invention, in part, are achieved with bodies which are positioned in relation to a sanitary unit such as a toilet bowl, urinal, or the like, to enable flush water to come directly into contact with at least a portion of the bodies. The bodies include a solid sanitizing material containing as essential active ingredients an intimate admixture of (a) one or more synthetic detergents of the nonionic, cationic or amphoteric type, and compatible mixtures thereof, which, preferably, are solid at room temperature, and (b) an acidic or hydrogen ion furnishing agent in the form of one or more acids or acid-forming salts or both. As employed in the description and claims, the term "acidic agent" is intended to encompass both acids and acid-forming salts, and compatible mixtures thereof, having utility in the practice of the present invention. The term "acid-forming salt" as used herein is intended to include salts which in the presence of water are acid reacting or are capable of forming an acid reacting chemical. The solid sanitizing material, upon contact with flush water, is dissolved in part thereby automatically metering into the water with each use of the sanitary unit a quantity of active ingredients capable of effectively cleansing, deodorizing, destaining, degerming, and removing inorganic and organic deposits and encrustations not only in the sanitary unit itself but in the drain conduits associated with the unit. Thus, in a unitary body, there is provided means for overcoming all of the daily sanitation problems encountered with sanitary units such as toilet bowls, urinals, and the like, without the need for swabbing or other unpleasant manual contact with the units. The active ingredients of the bodies of this invention, while capable in themselves of providing the cleansing and other action mentioned, can, as will be described hereafter in detail, incorporate other agents which serve to enhance, augment and complement the action of the active ingredients thereof.

The bodies include holders for enclosing the solid sanitizing material. The holders most advantageously are formed of a resilient, water-insoluble, corrosion resistant plastic material having means for supporting thereon a quantity of the solid sanitizing material briefly described hereinabove.

The nonionic, cationic, and amphoteric synthetic detergents having utility in the practice of the present invention form a wide group. As stated, the detergents used advantageously are solid at room temperatures and should be soluble, or at least parly soluble, in cold water. Exemplary of nonionic synthetic detergents useful in the formation of the solid sanitizing materials of this invention are ethylene oxide adducts of straight chain fatty acids, long chain fatty acid alkanolamides, ethylene oxide adducts of long chain fatty acid alkanolamides, fatty acid dialkyl amine oxides, and the like. In addition, commercially available proprietary products such as those sold under the trademarks "Detergent MXP," a built polyoxyethylene ester (Monsanto Chemical Co.) and "Alrosol C," a fatty alkylolamide condensate (Geigy Industrial Chemical Co.) can be used. Exemplary of cationic synthetic detergents that can be employed are fatty acid heterocyclic tertiary amine salts, quaternary ammonium derivatives of long chain fatty acid substituted imidazolines, and the like. Proprietary products such as the one sold under the trademark "Vantoc DP," a built quaternary ammonium compound plus a nonionic detergent (Imperial Chemical Industries) also can be used. Examples of amphoteric synthetic detergents having utility in the practice of this invention are the sodium salts of higher fatty acid amino propionates such as disodium N-lauryl beta-iminodipropionate, the disodium salt of N-tallow beta-amino dipropionate, the sodium salt of N-coco beta-amino propionate, and the like. Of the numerous nonionic synthetic detergents having utility for the purposes of this invention, coconut oil fatty acid alkanolamides, particularly coconut oil fatty acid or lauric or myristic acid amides of monoethanolamine and of diethanolamine are preferred. Of the cationic synthetic detergents, long chain fatty acid, especially $C_{14}$–$C_{22}$ fatty acid, quaternary imidazolinates are preferable. Of the amphoteric synthetic detergents, the product sold under the trademark "Deriphat 151" (General Mills, Inc.), a sodium salt of N-coco beta-amino propionate, is preferred. The synthetic detergents act not only as cleansing and lime soap dispersing agents, but especially in the case of the cationic detergents, also function as bactericidal and/or bacteriostatic agents when released by the flush water. In addition, the synthetic detergents, in certain instances, provide an abrasive or scrubbing action in the flush water due to the fact that not all of the detergent dislodged in the flushing action goes into solution. The non-dissolved crystals of the detergent thus serve as minute scrubbers or abraders as they are propelled around the sanitary unit by the flush water.

The acidic agents utilized in the solid sanitizing bodies of this invention also may be selected from a wide group. Included in this group are mineral acids such as phosphoric acids, notably orthophosphoric acid, hydrochloric acid, boric acid, orthoboric acid, perchloric acid, sulfuric acid, and the like; organic acids exemplified by citric acid, acetic acid, cresotinic acid, and the like; and acid-forming salts such as monosodium phosphate, sodium bisulfate, and the like; and compatible mixtures thereof. Of the aforementioned acidic agents, orthophosphoric acid, or a phosphoric acid-producing salt such as monosodium phosphate, and citric acid provide especially effective solid sanitizing materials. Orthophosphoric acid, for example, readily removes hard water scale, adhering organic matter, and dissolves uric acid crystal deposits. In addition, it acts as a disinfectant and a deodorizer. Citric acid, on the other hand, is an excellent sequestering and chelating agent, and acts to combine with iron, calcium, magnesium and other metal ions present in the flush water to form soluble salts thereby preventing buildup of mineral salt deposits in the sanitary unit and the drain conduits associated with it. Various of the acids also exhibit bactericidal and/or bacteriostatic effects which are helpful in eliminating malodors in and around the sanitary unit.

The proportions of synthetic detergent and acidic agent utilized in forming the solid sanitizing material of this invention are variable. The generally optimum objectives of the invention, however, are attained with ratios, basis weight, of the synthetic detergent to the acidic agent of the order of from about 1 to about 100 of the synthetic detergent to about 1 of the acidic agent.

As indicated above, the solid sanitizing material of the present invention may incorporate ingredients which serve to enhance, augment and complement the essential active ingredients thereof. To this end, germicidal and/or bacteriostatic agents such as benzyl dimethyl tetradecyl ammonium chloride and the tributyltin chloride complex of an ethoxylated abietylamine condensate, chelating agents exemplified by ethylenediamine tetraacetic acid, perfumes and coloring agents may be added to the basic formulation. Generally speaking, such additives will usually comprise only a minor proportion, usually less than 5%, by weight, of the solid material.

While, as stated, the synethic detergents employed provide some scrubbing or abrasive action in the flush water, this action can be substantially increased by replacing a portion of one or both of the essential ingredients of the solid sanitizing material with one or more solid inert substances which are insoluble in water exemplary of which are volcanic ash, diatomaceous earth, clays, asbestos, and the like. These substances, in addition to providing excellent scrubbing or abrading action, serve also to bind the solid sanitizing material into a solid, integrated body. In addition, they act as absorbing and/or adsorbing agents for foreign matter present in the sanitary unit. The quantity of inert substances used in the formulation of the solid sanitizing material is somewhat variable. Generally speaking, the quantity thereof used in lieu of one or both of the essential ingredients will be below about 50%, by weight, of the finished solid sanitizing body, more desirably from about 10% to about 20%, by weight, thereof.

In forming bars or molded bodies from the synthetic detergents and acidic agents, they desirably are first placed in a suitable container and then heated until molten. The molten mass is stirred to form a substantially homogeneous mixture and then poured into molds of any desired shape or configuration. After cooling, the shaped bodies can be packaged for shipment.

The following examples are illustrative of the practice of the present invention but they are not to be construed in any way as limitative of the full scope of the invention since various changes and modifications can be made in the light of the guiding principles and teaching disclosed herein. The quantities recited are in terms of weight percent.

EXAMPLE 1

Coconut oil fatty acid monoethanolamide _____ 20
Monosodium phosphate _____ 80

EXAMPLE 2

Coconut oil fatty acid monoethanolamide _____ 99
Monosodium phosphate _____ 1

EXAMPLE 3

Quaternary derivative of substituted $C_{14}$–$C_{22}$ fatty acid imidazoline salt _____ 20
Citric acid _____ 80

EXAMPLE 4

Quaternary derivative of substituted $C_{14}$–$C_{22}$ fatty acid imidazoline salt _____ 95
Citric acid _____ 5

EXAMPLE 5

Citric acid _____ 20
Monosodium phosphate _____ 20
Ethylenediamine tetraacetic acid _____ 15
Orthophosphoric acid (85%) _____ 5
Coconut monoethanolamide _____ 25
Nonylphenoxypoly (ethyleneoxy) ethanol (IGEPAL CO–990) _____ 5
Quaternary derivative of substituted $C_{14}$–$C_{22}$ fatty acid imidazoline salt _____ 10

EXAMPLE 6

Citric acid _____ 5
Monosodium phosphate _____ 20
Ethylenediamine tetraacetic acid _____ 5
Orthophosphoric acid (85%) _____ 5
Coconut oil fatty acid monoethanolamide _____ 35
Nonylphenoxypoly (ethyleneoxy) ethanol (IGEPAL CO–990) _____ 5
Quaternary derivative of substituted $C_{14}$–$C_{22}$ fatty acid imidazoline salt _____ 5
Diatomaceous earth _____ 20

EXAMPLE 7

Monosodium phosphate _____ 6
Orthophosphoric acid (85%) _____ 6
Citric acid _____ 1
Orthoboric acid _____ 1
1-hydroxyethyl-2-alkyl ($C_{13}$) imidazoline phosphate _____ 0.5
Benzyl dimethyl tetradecyl ammonium chloride ___ 0.2
Tributyltin chloride complex of ethoxylated abietylamine condensate _____ 0.1
IGEPAL CO–990 _____ 85.2

EXAMPLE 8

Sodium salt of N-coco beta-amino propionate (Deriphat 151) _____ 30
Monosodium phosphate _____ 70

Referring now to the drawing:

FIG. 1 is a view in perspective of an embodiment of a sanitizing body of the present invention;

FIG. 2 is an enlarged fragmentary vertical sectional view taken substantially along line 2—2 of FIG. 3;

FIG. 3 is a view in perspective, partly broken away, showing said embodiment mounted on a toilet bowl;

FIG. 4 is an enlarged fragmentary view corresponding to the view of FIG. 3 showing details of a portion of said embodiment;

FIG. 5 is an enlarged fragmentary vertical sectional view howing details of the flexible lip or blade of said embodiment;

FIG. 6 is a view in perspective of another embodiment of a sanitizing body of this invention positioned in a urinal;

FIG. 7 is a top plan view of the embodiment shown in FIG. 6;

FIG. 8 is a side view in elevation, partly in section, of the embodiment shown in FIG. 6;

FIG. 9 is a vertical sectional view taken substantially along line 9—9 of FIG. 7; and FIG. 10 is an exploded sectional view showing the cover and base portions of the embodiment illustrated in FIG. 6.

As shown in FIGS. 2 and 3, the embodiment of the sanitizing body there illustrated is mounted in operative position on a conventional commode. The commode comprises a molded or cast bowl 10 having a basin 12. The bowl 10 is provided with a pedestal 14 which rests on a supporting surface such as a floor to which the pedestal is affixed by screws or bolts. The top of the bowl is formed into a rim 16, the walls of which define a flush water channel 18 desirably extending completely around the bowl. The channel 18 has a plurality of water distributing openings or holes 20 which admit water to the basin 12. A seat 22 is hingeably secured to the bowl 10 at the rim 16 thereof.

The sanitizing body consists of a holder 28 which essentially comprises an upper, bowl rim engaging portion 30, a lower, trough-like solid sanitizing material supporting portion 32 and a flexible basin wall conforming lip portion 34. The portions 30 and 32 are each preferably made of extruded plastic material having the same cross-section throughout the length thereof. Exemplary of plastic materials having utility in this connection are polystyrene, polyethylene, polypropylene, and the like. The upper portion 30 has a narrow, inwardly extending end panel 36, the outer free edge 38 of which is thickened and engages the outer wall of the bowl 10 when the holder 28 is mounted thereon. The panel 36 is joined along its inner margin to an upwardly and outwardly extending panel 40 which, in turn, is joined to the lower margin of an upwardly extending, relatively wide panel 42. The panel 42 is joined along its upper margin to a substantially horizontal, toilet bowl rim-engaging panel 44. The panel 44, in turn, is joined to a relatively large, downwardly and outwardly extending panel 46, the lower edge 48 of which is formed into a rounded, open-ended slit channel 50 which is slit along its entire length. The panel 46 hides the contents of the trough-like portion 32 from view and acts as a guard to prevent human waste materials from coming into contact with said contents.

The trough-like lower portion 32 of the holder 28 comprises generally upwardly and outwardly extending walls 52 and 54 joined at their lower margins to a relatively narrow bottom wall 56. The upper edge of the wall 52 has a bead 58 formed thereon which is received in the slit channel 50 in the lower edge 48 of the panel 46 and is heat sealed therein. The upper edge 60 of the wall 54 is thickened, and is provided with substantially rectangularly shapd channel 62.

The flexible lip portion 34 of the holder 28 advantageously is fabricated of a relatively soft, rubbery or plastic material such as vinyl plastic, or the like, and is provided with an elongated narrow, rectangularly shaped extension 64 which is snugly frictionally engaged in the channel 62 at the upper edge 60 of the wall 54. Joined to the inner margin of the extension 64 is wedge-shaped blade 66, the highly flexible free edge 68 of which engages and conforms to the wall of the basin 12 of the commode. Th flexible character of the blade 66 enables the holder to be used on commodes having basin walls of widely varying curvature. Apart from this function, the blade 66 acts also to divert flush water passing through openings 20 of the channel 18 onto the exposed surfaces of a molded mass of solid sanitizing material 70. The material 70 may be granular or particulate in character. However, in accordance with the preferred aspects of the present invention, the material 70 advantageously is a solid, unitary mass which has been poured directly into the lower, trough-like portion 32 of the holder placed in a suitable mold cavity supplying temporary end walls to the portion 32. In the embodiment shown, the solid, molded mass of material 70 is retained in the portion 32 by means of an upwardly extending, arrow-shaped elongated projection 72 joined to the lower wall 56 of the portion 32. The projection 72, of course, is only exemplary of any of various means for anchoring the mass of material 70 in position. Thus, for example, inwardly extending projections joined to the walls 52 and 54 could serve a like purpose.

The material 70 may comprise any of the known solid sanitizing materials, including paradichlorobenzene cakes. In accordance with a particularly preferred embodiment of the holder, however, the material 70 most advantageously is formed of a solid sanitizing material containing as its essential active ingredients (a) one or more synthetic detergents of the nonionic, cationic or amphoteric type, or mixtures thereof, and (b) one or more acidic agents, as described hereinabove. Such a material can be readily poured and solidified in the portion 32, and will provide long lasting protection for the commode against the problems previously outlined as being common to such sanitary units.

In utilizing the holder 28, the panels 42 and 46 of the upper portion 30 are spread apart by moving the thickened edge 38 of the narrow panel 36 outwardly, away from the flexible tip portion 34. This provides ample clearance for positioning the holder on the rim 16 of the commode as shown in FIGS. 2 and 3. When the holder is in proper position on the rim, the panel 44 will rest on the top of rim, and the edge 38 of the panel 36 and the edge 68 of the blade 66 will be in engagement with the walls of the bowl 10. The lip portion 34 and the lower, solid sanitizing material supporting portion 32 of the holder will be positioned below the openings 20 of the flush water channel 18. With each use of the commode, flush water passing through the openings 20 adjacent the holder 28 will be diverted by the lip portion 34 onto exposed surfaces of the solid sanitizing material 70. The water will dissolve a portion of the material 70 which will then be carried into the basin 12 and circulated therearound.

In FIGS. 6–10 of the drawing there is illustrated a form of a sanitizing body particularly adapted for use in a urinal of either the floor or wall mounted type. The urinal shown is of th wall mounted type and comprises a bowl 80 having a basin 82. Such basins may have flush water released into them at regular intervals by automatic control means, or manual or pedal operated flush controls may be provided.

In the embodiment of the sanitizing body shown, the holder 86 comprises a relatively flexible base portion 88 for supporting a bar or cake 90 of a solid sanitizing material, and a rigid cover portion 92. The base portion 88 advantageously is fabricated of a corrosion and water resistant flexible, rubbery plastic such as vinyl for reasons that will become clear as the description proceeds. The cover portion 92, on the other hand, desirably is fabricated of a high impact strength, corrosion and water resistant plastic such as polyethylene, polypropylene, polystyrene, or the like, to provide a protective shield for the bar or cake 90. As illustrated, the base portion 88 is a molded one-piece flattened body of generally triangular shape having a tapered or wedge-like, relatively wide, flexible peripheral edge or lip 94. The flexible character of the lip 94 enables the holder 86 to readily conform to the configuration of the urinal in the area of the drain thereof and provides an effective seal with the wall of the basin 82 to prevent solid foreign matter or refuse from reaching the drain and blocking it. Inwardly of the lip 94 there are provided groups of openings or holes 96 of a size to permit fluids to readily pass therethrough but to prevent discarded foreign matter such as cigarette butts and chewing gum from passing through. The triangularly shaped center area 98 of the base portion 88 desirably is not perforated to prevent dissolved portions of the bar or cake 90 from passing directly downwardly into the drain of the urinal. At each of the apices of the center area 98, curved slots 100 are provided for a purpose which will become clear as the description proceeds. Intermediate the apices of the center area 98, downwardly extending projections 101 are provided to facilitate engagement of the base portion 88 with the cover portion 92.

The cover portion 92, like the base portion 88, is generally triangular in shape. The side walls 102 of the cover portion 92 extend upwardly and inwardly where they are joined to a top wall 104. As viewed in FIGS. 8–10, the cover portion 88 has a frustum-like appearance. Each of the side walls 102 of the portion 88 has a plurality of spaced upwardly extending and horizontally disposed intersecting ribs 106 which define a plurality of substantially rectangular openings or holes 108 through the side walls 102. The top wall 104, similarly is provided with a plurality of spaced intersecting ribs 110 which define openings or holes 112 therethrough. The openings in the side walls 102 and top wall 104 of the cover portion 92 enable flush water both to come into contact with the bar or cake 90 and to carry dissolved portions thereof into the basin 82 of the urinal. The top wall 104 further is provided with a handle 114 to facilitate installation and removal of the holder.

The lower margins of the side walls 102 have an outwardly extending, base portion-engaging flange 116 to which are joined downwardly extending legs 118. The legs are generally T-shaped and are adapted to be snapped into engagement with base portion 88 through the slots 100 provided therein thereby to securely hold the cover portion 92 on the base portion 88. The legs 118, when engaged in the slots 100, rest on the basin and act to support the central area 98 of the base portion 88 above and away from the drain of the urinal.

In utilizing the holder 86, a bar or cake 90 of a solid sanitizing material is first positioned on the center area 98 of the base portion 88. The cover portion 92 is then secured on the base portion 88 by engaging the legs 118 in the slots 100. The handle 114 of the cover portion 92 is used to properly position the holder in the urinal as shown in FIG. 6. As in the case of the previously described embodiment of the holder 28, the bar or cake 90 utilized in connection with the holder 86 most advantageously comprises a solid sanitizing material comprising as its essential active ingredients one or more synthetic detergents of the nonionic, cationic, and/or amphoteric type, or mixtures thereof, and one or more acidic agents in specified proportions, as described hereinabove. Such a material, with each use of the urinal, provides automatic and metered release of agents which effectively control essentially all of the sanitizing problems encountered in such sanitary units.

It should be understood that various modifications may be made in the illustrative embodiments of the present invention described above without deviating from the broader aspects of the invention.

What is claimed is:

1. A body for use in connection with a sanitary unit such as a toilet bowl, a urinal, and the like, which is positioned in relation thereto to enable flush water to come directly into contact with at least a portion of the body, said body including a mass of a solid sanitizing material which will dissolve in part in flush water admitted to said sanitary unit thereby automatically providing a metered quantity of the solid material for sanitizing said unit with each flushing of the sanitary unit over a prolonged period of time, said solid material containing as essential active ingredients an intimate admixture of a synthetic detergent which is a solid at room temperatures and an acidic agent, the acidic agent being selected from the group consisting of mineral acids, organic acids, and acid-forming salts, and compatible mixtures thereof, the synthetic detergent serving to cleanse, deodorize and disinfect the sanitary unit, and the acidic agent serving to lower the pH of the flush water coming into contact with it and to remove, dissolve and solubilize inorganic and organic deposits and encrustations in the sanitary unit and its associated drain conduits, and to prevent and arrest the growth of bacteria and the like.

2. A body as claimed in claim 1 wherein the ratio by weight of synthetic detergent to acidic agent in the solid sanitizing material ranges from about 1 to about 100 of the synthetic detergent to about 1 of the acidic agent.

3. A body as claimed in claim 1 wherein the synthetic detergent is a member of the group consisting of nonionic, cationic and amphoteric synthetic detergents, and compatible mixtures thereof.

4. A body as claimed in claim 1 wherein the acidic agent comprises an acid-forming salt which in the presence of water is acid reacting.

5. A body as claimed in claim 1 wherein the solid sanitizing material contains an inert abrasive substance which is substantially insoluble in water.

6. A body as claimed in claim 1 wherein the solid sanitizing material contains additives in the form of germicides, bacteriostats, chelating and sequestering agents, the quantity of said additives in said material ranging up to about 5%, by weight, of the material.

7. A body as claimed in claim 1 wherein the acidic agent is a mineral acid selected from the group consisting of phosphoric acids, hydrochloric acid, boric acids, perchloric acid and sulfuric acid, and compatible mixtures thereof.

8. A body as claimed in claim 7 wherein the acidic agent comprises a mixture of citric acid and orthoboric acid.

9. A body as claimed in claim 1 wherein the solid sanitizing material comprises a $C_{12}$–$C_{22}$ fatty acid alkanolamide and an acid-forming salt, the concentration of the acid-forming salt in the material ranging, by weight, from about 1% to about 80% of the material.

10. A body as claimed in claim 1 wherein the solid sanitizing material comprises a quaternary derivative of substituted $C_{14}$–$C_{22}$ fatty acid imidazoline salt, and citric acid, the concentration of the citric acid in the material ranging, by weight, from about 5% to about 80% of the material.

11. A body as claimed in claim 1 wherein the solid sanitizing material comprises, basis approximate weight percent:

(a) monosodium phosphate _____ 6
(b) orthophosphoric acid _____ 1
(c) citric acid _____ 1
(d) orthoboric acid _____ 1
(e) 1-hydroxyethyl-2-alkyl imidazoline phosphate _____ 0.5
(f) benzyl dimethyl tetradecyl ammonium chloride _____ 0.2
(g) tributyltin chloride complex of ethoxylated abietylamine condensate _____ 0.1
(h) balance synthetic detergent.

12. A body as claimed in claim 1 wherein the solid sanitizing material comprises, basis approximate weight percent:

(a) citric acid _____ 20
(b) monosodium phosphate _____ 20
(c) ethylenediamine tetraacetic acid _____ 15
(d) orthophosphoric acid _____ 5
(e) coconut monoethanolamide _____ 25
(f) nonylphenoxypoly (ethyleneoxy) ethanol _____ 5
(g) quaternary derivative of substituted $C_{14}$–$C_{22}$ fatty acid imidazoline salt _____ 10

13. A body as claimed in claim 12 wherein the total percentage by weight of the (e), (f) and (g) ingredients is replaced up to 20% of the total of said sanitizing material by an inert material.

References Cited

UNITED STATES PATENTS

| Re. 24,412 | 12/1957 | Hardy | 252—99 |
| 555,888 | 3/1896 | Roberts | 4—109 |
| 680,179 | 8/1901 | Schoneman | 4—231 |
| 1,067,472 | 7/1913 | Creed | 4—231 |
| 1,091,265 | 3/1914 | Wohlander | 4—231 |
| 1,557,266 | 10/1925 | Moore | 424—150 |
| 1,880,962 | 10/1932 | Koppelman | 4—109 |
| 1,916,357 | 7/1933 | Brownstein | 4—109 |
| 2,065,849 | 12/1936 | Andersen | 167—71 |
| 2,263,948 | 11/1941 | Halvorson et al. | 167—18 |
| 2,346,632 | 4/1944 | Wolfert et al. | 167—22 |
| 2,406,902 | 9/1946 | Rawlins | 252—106 |
| 2,474,412 | 6/1949 | Bersworth | 252—106 |
| 2,515,280 | 7/1950 | Mac Mahon et al. | 252—135 |
| 2,519,747 | 8/1950 | Bu Bois | 252—106 |
| 2,653,156 | 9/1953 | Deutsch et al. | 260—404 |
| 2,746,928 | 5/1956 | Darragh et al. | 252—106 |
| 2,814,597 | 11/1957 | Wenneis et al. | 252—107 |
| 2,970,145 | 1/1961 | Benneville | 260—247.5 |
| 2,977,280 | 3/1961 | Forsyth et al. | 167—53.2 |
| 2,977,315 | 3/1961 | Scheib et al. | 252—106 |
| 3,028,427 | 4/1962 | Winicov | 260—576.6 X |

LAVERNE D. GEIGER, Primary Examiner

D. B. MASSENBERG, Assistant Examiner